United States Patent [19]

Ermidis

[11] 3,839,292

[45] Oct. 1, 1974

[54] POLYURETHANE CURATIVE COMPRISING 2-CYANO-P-PHENYLENE DIAMINE AND OPTIONALLY METAL SALTS

[75] Inventor: Nicholas P. Ermidis, West New York, N.J.

[73] Assignee: American Cyanamid Company, Stamford, Conn.

[22] Filed: Oct. 12, 1973

[21] Appl. No.: 406,057

[52] U.S. Cl....... 260/75 NH, 252/182, 260/2.5 AM, 260/77.5 AM, 260/465 E
[51] Int. Cl............................................. C08g 22/16
[58] Field of Search... 260/75 NH, 77.5 AM, 2.5 AM, 260/465 E

[56] References Cited
UNITED STATES PATENTS

| | | | |
|---|---|---|---|
| 2,921,915 | 1/1960 | Brochhagen et al. | 260/2.5 AC |
| 2,929,800 | 3/1960 | Hill | 260/77.5 AM |
| 3,036,996 | 5/1962 | Kogon | 260/77.5 AM |
| 3,511,814 | 5/1970 | Ogura et al. | 260/77.5 AM |
| 3,629,168 | 12/1971 | Ryan | 260/18 TN |
| 3,755,261 | 8/1973 | Van Gulick | 260/75 NH |
| 3,783,142 | 1/1974 | Bakke et al. | 260/465 E |

OTHER PUBLICATIONS

Chemical Abstracts, Vol. 77, (1972) 49156-j referencing Ger. off. 2,153,602.

*Primary Examiner*—H. S. Cockeram
*Attorney, Agent, or Firm*—John M. Miele

[57] ABSTRACT

A diamine curative system for polyurethane prepolymers having terminally reactive isocyanate groups is provided comprising 2-cyano-p-phenylene diamine said prepolymers being prepared by reacting a polymeric diol with a stoichiometric excess of 2,4-tolylene diisocyanate, 2,6-tolylene diisocyanate or an isomeric mixture of said tolylene diisocyanates containing a major proportion of the 2,4-isomer.

18 Claims, No Drawings

POLYURETHANE CURATIVE COMPRISING 2-CYANO-P-PHENYLENE DIAMINE AND OPTIONALLY METAL SALTS

Generally stated, the subject matter of the present invention relates to a curative system for polyurethane prepolymers. More particularly, the invention relates to a diamine curative system for polyurethane prepolymers containing terminal isocyanate groups.

BACKGROUND OF THE INVENTION

Polyurethane prepolymers, obtained by the reaction of an excess of tolylene diisocyanate with a polymeric diol, are commonly employed to prepare cast polyurethane elastomers when cured or chain-extended with organic aromatic diamines. The most commonly employed diamine is 4,4'-methylenebis (o-chloroaniline), which, when employed to cure prepolymers prepared from tolylene diisocyanate, provides elastomers having excellent physical properties.

It is well recognized in the art that 2,4-tolylene diisocyanate contains two unequally reactive isocyanate groups and that prepolymers prepared from a major proportion of this diisocyanate have terminally hindered isocyanate groups. These prepolymers are generally chain extended with diamines which have two equally reactive amino groups, since it is important that the rate of the chain-extending reaction be reasonably fast. A diamine having two unequally reactive amino groups has a generally slow rate of reaction. Therefore, 4,4'-methylenebis (o-chloroaniline) has been the preferred curing agent.

The present invention represents the culmination of a long series of investigations, conducted largely by the inventor, directed to finding a new and improved diamine curative system for isocyanate terminated polyurethane prepolymers.

Accordingly, it is a primary object of the present invention to provide a new and improved diamine curative system for isocyanate-terminated polyurethane prepolymers.

Another object of the invention is to provide an improved process for chain extending isocyanate terminated polyurethane prepolymers.

It is yet another object of the invention to provide new and improved polyurethane elastomers which have been chain extended with the novel diamine curative composition.

Generally then, it is an object of this invention to provide a new and improved diamine curative system for isocyanate terminated prepolymers, a method of employing such composition, as well as the improved polyurethane elastomers obtained therefrom.

Additional objects and advantages will be set forth in part in the description which follows, and in part will be obvious from the description or may be learned by the practice of the invention; the objects and advantages being realized and attained by means of compositions and improvements, particularly pointed out in the appended claims.

THE INVENTION

To achieve the foregoing objects and in accordance with its purpose, this invention as embodied and broadly described, provides a diamine curative system for polyurethane prepolymers having terminally reactive isocyanate groups comprising 2-cyano-p-phenylene diamine, said prepolymers being prepared by reacting a polymeric diol with a stoichiometric excess of 2,4-tolylene diisocyanate, 2,6-tolylene diisocyanate or an isomeric mixture of said tolylene diisocyanates containing a major proportion of the 2,4-isomer.

The present invention further provides an improved process for preparing polyurethane elastomers employing the novel diamine curative system of the present invention, as well as the polyurethane elastomers thereby prepared.

It is to be understood that both the foregoing general description and the following detailed description are exemplary and explanatory but are not restrictive of the invention.

A diamine curative system for polyurethane prepolymers having terminal isocyanate groups has now been discovered which comprises 2-cyano-p-phenylene diamine alone or preferentially combined with an aliphatic mono- or dicarboxylic acid, or metal salt thereof. In addition, the invention relates to a polyurethane elastomer prepared using this curative system.

The present invention provides in its preferred embodiment a diamine curative system which has a fast rate of reaction, a melting point of about 87°C, which is generally below the chain-extending temperature and thereby facilitates solubility of the curative, broader control of the time available for mixing, which generally provides elastomers having overall higher hardness and increased tensile strength, modulus and tear strength.

While 2-cyano-p-phenylene diamine is known, it is not known as a polyurethane curative. Used by itself it is about as good a curative as 4,4'-methylenebis (o-chloroaniline), but in combination with an aliphatic mono or dicarboxylic acid it is considerably better than 4,4'-methylenebis (o-chloroaniline).

The present invention resides in the discovery that 2-cyano-p-phenylene diamine alone or combined with minor amounts of an aliphatic mono- or polycarboxylic acid, or a metal salt thereof, provides a faster rate of reaction and unexpectedly superior properties, when used as a chain-extending agent for polyurethane prepolymers made from 2,4-tolylene diisocyanate or isomeric mixtures containing a major proportion of 2,4-tolylene diisocyanate.

In accordance with the invention, the curative system is most useful with polyurethane prepolymers prepared by the well known reaction of a stoichiometric excess of 2,4-tolylene diisocyanate, 2,6-tolylene diisocyanate or mixtures of 2,4- and 2,6-tolylene diisocyanate, in which the 2,4- isomer constitutes a major proportion of the mixture, with a polymeric diol. Such reaction products, as is well known, contain terminally reactive isocyanate groups and are generally referred to in the art as prepolymers.

Useful polymeric diols include, as is well known in the art, polyesters, polyethers, polyesteramides, polyformals, and the like. These polyols contain terminal hydroxyl groups and have molecular weights in the range of about 500 to 5,000, preferably about 500 to 3,000.

In most cases the prepolymers are chain-extended with from about 80 to 110 percent of the stoichiometrically required amount of 2-cyano-p-phenylene diamine. In some cases it may be desirable to use slightly more than the stoichiometric amount.

The aliphatic mono- or dicarboxylic acids useful in combination with 2-cyano-p-phenylene diamine should be either soluble in the polymer composition, or if a solid, sufficiently low melting to give a homogenous mixture, and if a liquid, sufficiently high boiling to permit mixing. They may be defined as those acids which have a melting point below about 110°C and a boiling point above about 140°C and include azelaic acid, glutaric acid, pimelic acid, propionic acid, valeric acid, caproic acid, caprylic acid, capric acid, myristic acid, palmitic acid, stearic acid, and the like, and metal salts thereof. The acids are used in combination with 2-cyano-p-phenylene diamine in an amount, based on the weight of the prepolymer, of from about 0.02 to about 1 percent by weight, preferably about 0.1 to 0.5 percent by weight. With regard to the metal salts of the aliphatic mono- or dicarboxylic acids, tin, molybdenum and chromium are considered useful with the tin salts preferred, especially tin octoate.

The following example is provided for illustrative purposes and may include particular features of the invention. However, the sample should not be construed as limiting the invention, many variations of which are possible without departing from the spirit or scope thereof.

EXAMPLE

A polyurethane prepolymer containing 3.1 percent isocyanate, prepared by reacting polyethylene adipate with a stoichiometric excess of tolylene diisocyanate, was mixed at a temperature of 100°C with 95 percent of the stoichiometrically required amount of the indicated curative compositions and then compression molded for 30 minutes at 100°C into 6 inches × 6 inches × ⅛ inch sheets, from which specimens were cut for a measurement of stress-strain properties, using an Instron Tester. The molded sheets were post-cured for 16 hours at 100°C in a forced draft oven prior to testing at 25°C/50% R.H. Physical properties of the molded compositions are given in the accompanying table.

Table

|  | Composition | | | |
|---|---|---|---|---|
|  | A | B | C | D |
| Prepolymer | 100 | 100 | 100 | 100 |
| 2-cyano-p-phenylene diamine | 4.8 | 4.8 | 4.8 | — |
| 4,4'-methylenebis (o-chloro-aniline) | — | — | — | 9.33 |
| Azelaic Acid | — | 0.1 | 0.2 | — |
| Pot Life[1], minutes at 100°C | 15 | 9 | 6 | 15 |
| Physical Properties | | | | |
| Shore A Hardness | 85 | 88 | 88 | 82 |
| Tensile, psi | 3800 | 8000 | 6000 | 5695 |
| Modulus, at 100%, psi | 650 | 735 | 795 | 525 |
| at 300%, psi | 1035 | 1395 | 1350 | 900 |
| Elongation, % | 760 | 780 | 750 | 730 |
| Physical Properties | | | | |
| Tear strength Die C, pli | 545 | 591 | 640 | 419 |
| Tear strength, Split Tear, pli | 379 | — | — | 325 |

[1]Time at 100°C to attain state of non-pourability.

It should be clearly apparent from the foregoing results that 2-cyano-p-phenylene diamine catalyzed by azelaic acid provides superior physical properties when used as a curative for polyurethane prepolymers, as compared with a widely used curative, 4,4'-methylenebis (o-chloroaniline). Moreover, the data indicate that the pot life, or working time, can be adjusted by catalyst concentration over a wide range without adversely affecting the physical properties of the cured polymer.

I claim:

1. A diamine curative composition for polyurethane prepolymers having terminally reactive isocyanate groups comprising 2-cyano-p-phenylene diamine, said prepolymers being prepared by reacting a polymeric diol with a stoichiometric excess of 2,4-tolylene diisocyanate, 2,6-tolylene diisocyanate or an isomeric mixture of said tolylene diisocyanate comprising a major proportion of the 2,4 isomer.

2. The diamine curative composition according to claim 1 comprising a minor amount of an aliphatic mono- or dicarboxylic acid or metal salt thereof.

3. The diamine curative composition of claim 2 wherein the concentration of the mono- or dicarboxylic acid or metal salt is from about 0.02 to 1 percent by weight, based on the weight of the prepolymer.

4. The diamine curative composition of claim 3 wherein the concentration is from about 0.1 to 0.5 percent by weight.

5. The diamine curative system of claim 2 wherein the acid is azelaic acid.

6. The diamine curative composition of claim 1 wherein the polymeric diol has a molecular weight of from about 500 to 5,000.

7. The diamine curative composition of claim 6 wherein the molecular weight is from about 500 to 3,000.

8. A polyurethane elastomer prepared by reacting a polyurethane prepolymer having terminally reactive isocyanate groups with from about 80 to 110 percent of the stoichiometrically required amount of 2-cyano-p-phenylene diamine, said prepolymer being prepared by reacting a polymeric diol with a stoichiometric excess of 2,4-tolylene diisocyanate, 2,6-tolylene diisocyanate or an isomeric mixture of said tolylene diisocyanates comprising a major proportion of the 2,4 isomer.

9. The polyurethane elastomer according to claim 8 wherein the polyurethane prepolymer is reacted with from 80 to 110 percent of the stoichiometrically required amount of 2-cyano-p-phenylene diamine and a minor amount of an aliphatic mono- or dicarboxylic acid or metal salt thereof.

10. The polyurethane elastomer of claim 9 wherein the concentration of aliphatic mono- or dicarboxylic acid or metal salt thereof is from about 0.02 to 1 percent by weight, based on the weight of the prepolymer.

11. The polyurethane elastomer according to claim 10 wherein the concentration is from about 0.1 to 0.5 percent by weight.

12. The polyurethane elastomer according to claim 9 wherein the acid is azelaic acid.

13. The polyurethane elastomer according to claim 8 wherein the polymeric diol has a molecular weight of from about 500 to 5,000.

14. The polyurethane elastomer according to claim 13 wherein the molecular weight is from about 500 to 3,000.

15. A process for preparing a polyurethane elastomer which comprises reacting a polyurethane prepolymer having terminally reactive isocyanate groups with from about 80 to 110 percent of the stoichiometrically required amount of 2-cyano-p-phenylene diamine, said prepolymer being prepared by reacting a polymeric diol with a stoichiometric excess of 2,4-tolylene diisocyanate, 2,6-tolylene diisocyanate or an isomeric mixture of said tolylene diisocyanates comprising a major proportion of the 2,4 isomer.

16. The process according to claim 15 wherein the prepolymer is reacted with 2-cyano-p-phenylene diamine and a minor amount of an aliphatic mono- or dicarboxylic acid or metal salt thereof.

17. The process according to claim 16 wherein the concentration of the mono- or dicarboxylic acid salt is from about 0.02 to 1 percent by weight based on the weight of the prepolymer.

18. The process according to claim 17 wherein the concentration is from about 0.1 to 0.5 percent by weight.

* * * * *